United States Patent [19]
Ziegler et al.

[11] Patent Number: 4,475,995
[45] Date of Patent: Oct. 9, 1984

[54] METHOD FOR ELECTROCHEMICAL REMOVAL OF METALLIC WORK MATERIAL

[75] Inventors: Gerhard Ziegler; Alfred Thilow, both of Stuttgart, Fed. Rep. of Germany

[73] Assignee: Robert Bosch GmbH, Stuttgart, Fed. Rep. of Germany

[21] Appl. No.: 484,567

[22] Filed: Apr. 13, 1983

[30] Foreign Application Priority Data

May 29, 1982 [DE] Fed. Rep. of Germany ....... 3220433

[51] Int. Cl.³ .............................. B23P 1/00; B23P 1/12
[52] U.S. Cl. .............................. 204/129.2; 204/129.5; 204/129.55; 204/224 M; 204/225
[58] Field of Search ............. 204/129.1, 129.2, 129.25, 204/129.5, 129.55, 129.35, 225; 204/224 M, 225

[56] References Cited

U.S. PATENT DOCUMENTS

| | | | |
|---|---|---|---|
| 3,271,281 | 9/1966 | Brown et al. | 204/129.35 |
| 3,440,156 | 4/1969 | Dickson | 204/224 M |
| 3,547,798 | 12/1970 | Haggerty | 204/224 M |
| 3,629,093 | 12/1971 | Sickels | 204/224 M |
| 3,630,877 | 12/1971 | Koike et al. | 204/129.25 X |
| 4,208,256 | 6/1980 | Inoue | 204/129.2 |
| 4,257,865 | 3/1981 | Semashko et al. | 204/129.25 X |
| 4,367,400 | 1/1983 | Otto et al. | 204/129.25 X |

FOREIGN PATENT DOCUMENTS

| | | |
|---|---|---|
| 2633629 | 2/1978 | Fed. Rep. of Germany . |
| 2824770 | 12/1979 | Fed. Rep. of Germany . |
| 46-26772 | 8/1971 | Japan .............................. 204/224 M |
| 1131716 | 10/1968 | United Kingdom . |

*Primary Examiner*—Donald R. Valentine
*Attorney, Agent, or Firm*—Frishauf, Holtz, Goodman & Woodward

[57] ABSTRACT

To correct the volume of a recess, for example to form the portion of the combustion chamber in the cylinder head of an internal combustion (IC) engine, a tool electrode (11) is introduced into the recess, the tool electrode having the shape of the desired recess. The tool electrode is spaced from the recess by a gap (12), which is filled with an electrolyte, such as a solution of NaNO₃. The extent of removal of volume of material from the workpiece is determined by controlling the current-time integral. To obtain an accurate measure of workpiece removal, the resistance across the gap can first be measured, and compared with a standard resistance, from which the current-time integral can then be controlled in accordance with an imperical determination; or, with the voltage across the gap held constant and the spacing between the electrode (11) and the workpiece being predetermined, a final current value will be determinative of the extent of material removal, so that the eventual volume of the recess can be accurately controlled. The method is particularly suitable for machining the cylinder heads of multi-cylinder IC engines, so that all combustion chambers of the cylinder heads will have the same volume, thus making the compression within all the cylinders identical and ensuring the smooth running of the engine.

11 Claims, 1 Drawing Figure

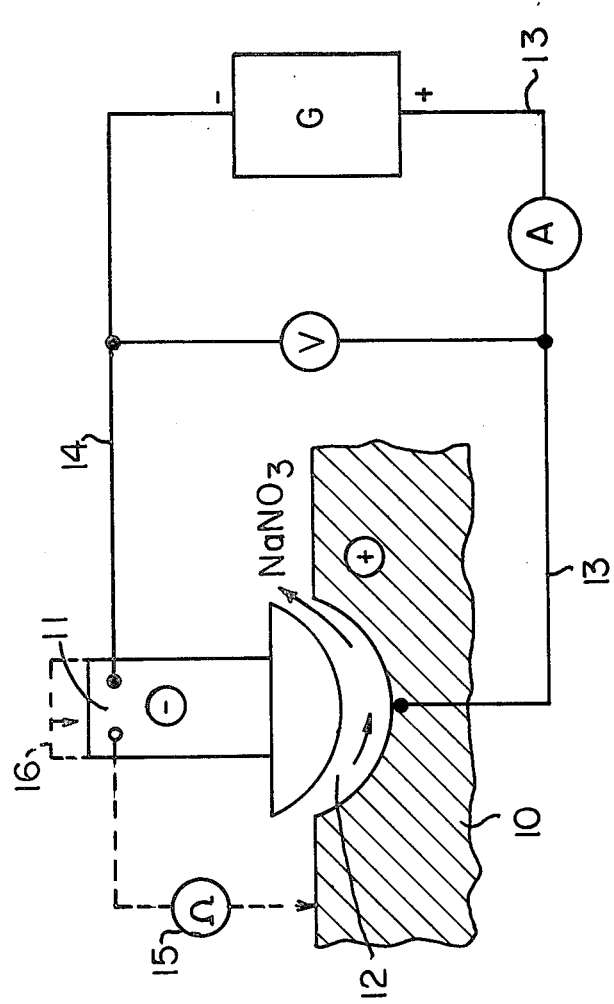

METHOD FOR ELECTROCHEMICAL REMOVAL OF METALLIC WORK MATERIAL

The present invention relates to a method for the electrochemical removal of metallic material from a workpiece, and more particularly to the removal of even small amounts of material in a recess or cavity formed during a preliminary process in the workpiece, and using electrical control technology.

BACKGROUND

It is known to remove material from a metallic workpiece (see German Patent Disclosure Document DE-OS No. 26 33 629) by using a work tool to produce an opening in a metallic workpiece. It has also been proposed to use an electrochemical method (see German Patent Disclosure Document DE-OS No. 28 24 770) to produce bevels at the edges of slits of engine cylinders for reciprocating engines. In this method, the cylinder walls are first coated with a hardening chrome layer, and the regions adjacent to the slit edges are deburred and rounded electrochemically.

It is also well known to process metallic workpieces by electrochemical workpiece removal. After empirical determination of the shape of the tool electrode and of working conditions, a precisely shaped and predetermined recess or cavity can be obtained in the workpiece. This process is relatively expensive. The operation is carried out with very high operating current and electrolyte pressures. Small operating gaps are used and thus there is a danger of electrical shorting during the electrochemical etching, which can cause damage due to the high operating current.

THE INVENTION

It is an object of the present invention to provide a method for the removal of material from a workpiece, and particularly a method suitable for the precision removal of material from the combustion chamber of cylinder heads of automotive-type internal combustion (IC) engines which is simple and requires less operating currents and pressures, and provides for accurate control of workpiece material removal.

Briefly, there is carried out, during the electrochemical removal of material from said workpiece, a correction of the volume of the electrolyte in the gap, proceeding on the basis of a prescribed greater final volume and determining a magnitude of the necessary material removal by means of a previously determined final value of an electrical parameter appearing in the electrochemical removal operation. The removal of material in successive operations of the process will usually be different because the raw workpieces as they come to the process have different initial volume and are to be brought to a final volume that is identical for all pieces. The magnitude of the electrochemical removal necessary in each case corresponds to a value determined with reference to a model or standard, or a computed value that has the proper mass and volume. A value of an electrical parameter observed during the electrochemical removal operation, for example, a current value or a resistance value e.g. with respect to the standard or by computation is used as a reference for the removal operation when machining the raw workpieces.

DRAWING

The FIGURE shows in a schematic form the arrangement employed in the method proposed in the present invention.

DETAILED DESCRIPTION

A workpiece 10 is positioned opposite to a tool-electrode 11 separated by an operating gap 12 which is filled with a liquid electrolyte, suitably and preferably an aqueous solution of $NaNO_3$. The volume of the recess is to be accurately machined. The electrode 11 has the required shape, and is spaced from the workpiece 10 by a precise distance with respect to the final, corrected volume of the recess. The operating gap 12 represents the workpiece volume which is to be corrected by the proposed method.

And electric power source circuit, such as a generator G, provides current for the installation. In the embodiment shown in the FIGURE, the power source provides a DC voltage of about 10 to 30 V. However, instead of a DC voltage, an alternating voltage can also be employed as the operating voltage, as is well known from electrochemical metal-working. The positive terminal of the power source G is connected over lead 13, and through a current measuring instrument A, to a standard workpiece 10. The negative terminal of power source G is connected over lead 14 to the tool-electrode 11. A voltage measuring instrument V is connected in parallel to power source G. A separate resistance measuring device 15 is provided, which may be used in an external measuring system to determine the electrical resistance between the tool-electrode 11 and workpiece 10. Resistance meter 15 is shown connected with broken lead lines since the connection is not permenent, but only showing measurement. The measured resistance is used as a measure of the actual volume in the operating gap 12 and in raw workpieces thus provides information regarding material still to be removed. Instead of measuring resistance for determination of the volume and the required removal still to be performed, other measuring procedures can be used, such as a volumetric measurement of the volume of the gap by determining the quantity of liquid required to fill the gap.

The invention which will be described applies the electrochemical removal of metallic material from the combustion chamber of the cylinder head of an automotive-type IC engine, which forms the workpiece 10. An electrolysis process takes place when a voltage is applied between the workpiece 10 and the tool-electrode 11, with material being removed from the workpiece 10 and being transported out by the electrolyte in the operating gap 12. By means of the electrochemical removal from workpiece 10, a volume increase takes place in the electrotyte-filled volume of the operating gap 12. The operating gap is thereby widened to have a final desired volume, which was previously determined.

In accordance with the invention, the level of the electrolysis current and the processing time serve as a measure of the progress of the material removal from the workpiece. The removal of material from workpiece 10 may be carried out in a process which holds the operating voltage (V) essentially constant at a predetermined value, while a final value of the electrolysis current (A), previously determined empirically is taken as a measure when the electrochemical material removal has achieved the desired result. The tool-electrode is in a fixed position during the processing. Th electrolysis current declines slowly, down to a predetermined final value, as the width of the operating gap 12 increases. The final value of the electrolysis current corresponds to a certain width of the operating gap 12 and thus also to that which will be the desired and predetermined final value of the volume. According to a feature of the invention, both the workpiece 10 and the tool-electrode 11 are in fixed relative operating positions. It is also possible to first locate the tool-electrode 11 in a preliminary processing position 16, in order to remove possibly existing unevenness of the workpiece 10, which could cause a short-circuit in an initially very narrow gap 12. After the pre-processing step, electrode 11 is then moved to its intended final operating position. A similar procedure can be employed, in which the tool-electrode 11 is fed towards the workpiece 10 during the processing in order to speed the material removal process, to be described below.

Instead of the electrochemical processing with fixed position tool-electrode 11, accompanied by limited reduction of the electrolysis current to a final, predetermined value, it is possible to employ a measurement process in which, as a first step, the electric resistance in ohms between tool-electrode 11 and workpiece 10 is determined for the required volume correction. In this process, the tool-electrode 11 and workpiece 10 are in a predetermined fixed position. In the electrochemical processing step, a material removal is carried out based on the measured resistance by controlling the product, or by the integral value, of the electrolysis current and time. Using the resistance, measured initially by measuring instrument 15, it is possible to determine the required material removal of the workpiece, thereby making the necessary correction thereon, to reach the final, desired volume of the operating gap.

The material removal can be accomplished in a controlled manner, selectively with either constant or varying electrolysis current, and with either fixed-position or with shifted-position, i.e. fed-in tool-electrode 11. The completion of the processing step will then occur upon reaching of the previously determined, e.g. empirically or calculated of value current and time: value of the product if the current is fixed; or for variable currents the integral, of the electrolysis current and the processing time.

Suitable and preferred operating conditions for example, are an operating gap 12 with of about 1 to 2 mm, and a shape of the tool-electrode 11 to closely fit the shape of the depression or recess in workpiece 10. For the application described here, in which the volume of the combustion chamber recess in the cylinder head of an automotive-type vehicle is to be corrected, small volume differences of about 10% of the total volume are to be usually corrected. Such fine corrections of volume are performed in a particularly simple and economical manner by the process of the present invention.

In the embodiment shown in the FIGURE, the tool-electrode 11 is located in a fixed position during the material removal process. However, instead of this, electrode 11 can also be fed towards workpiece 10 as the material removal progresses. If the electrolysis current is held approximately constant during such a process, then the effect will be to speed up the processing step. This is possible, however, only when the product of the electrolysis current and the processing time has previously been determined by resistance measurements and computation. The measurement of the electrical resistance is accomplished during a previous processing step by resistance measurement instrument 15 forming an OHM-meter. The measurement employs either a low DC voltage or a high-frequency alternating voltage, on the order of about 1 volt.

Fine-machining of the recess in the combustion chamber of cylinder heads for internal combustion engine is a particularly important field of this method. A feature of the invention is based upon an indirect measurement of the volume of the recess, by using Faraday's law for the electrolysis current, and controlling current as a parameter to obtain the desired gap volume. Both the operating current, as well as the measurement current for the determination of the resistance, can be DC or AC. Use of alternating current has the advantage of avoiding the occurence of polarization resistances between the tool-electrode 11 and workpiece 10.

The method of the present invention has the advantage that it employs low-processing currents and low-operating pressure of the electrolyte, while yielding a technically unobjectionable result. For the present application, the determining factor is the volume correction of the operating gap between the tool-electrode and workpiece. The shaping of the workpiece has been performed in a previous processing step, such as by casting with, or without subsequent machining. In the subsequent volume correction, the shaping of the recess or depression is of secondary importance. It is sufficient when the shape of the tool-electrode is of the same shape as the recess in the workpiece. The method of the present invention can be employed to special advantage when the electrochemical metal-working is intended essentially to correct a given volume. Such is the case, for example, with the recess forming the combustion chamber of the cylinder head of an automotive-type IC engine, where all the cylinders are to have combustion chambers with equal volume in order to obtain smooth running of the engine and lowest possible fuel consumption. Achieving equal volumes is usually not possible, as the cast cylinder heads distort during the cooling off of these parts, requiring a subsequent machining by mechanical means. This results in unequal material removal of the various ignition chamber recesses, leading to unequal ignition chamber volumes. Such unequal volumes can be readily and easily corrected by the method of the present invention. By the correction of the volume of the combustion chambers, equal compression in the individual cylinders of an internal combustion engine is achieved, regardless of small variations in the shape of the various recesses in the ignition chambers. This results in smooth and quiet operation of the engine.

EXAMPLE 1

The cylinder head of an IC engine, forming the workpiece 10 has an essentially spherical, or part spherical recess formed by casting, machining or the like. The volume of the recess is to be accurately controlled.

Material of cylinder head 10: Cast Aluminum-Silicon-Alloy
Material of electrode 11: Brass
Diameter of recess at edge: ~80 m.m.
Depth of recess: 17 m.m.
Gap at start, tool electrode fixed: variable
Electrolyte: Aqueous solution of $NaNO_3$ (20% o.w.)
Desired gap: 2 m.m. Voltage: 25 V
Current at start: 450–500 A (Depending on gap at start)
Current at desired gap: 360 A
Pressure of electrolyte in the gap: 2 bar Flow rate of electrolyte: 30 liter/minute
Volume of material removal: variable
Working time: variable.

EXAMPLE 2:

Condition the same as Example 1 except:
Voltage: 15 V
Gap at start: variable
Current at start: 220-250 A
Final current: 195 A
Time: variable.

We claim:

1. Method for electrochemical removal of metallic material from a raw workpiece (10) by a tool electrode (11) to achieve a final desired or standard volume of a depression in a surface of the raw workpiece including the steps of
   (a) providing a standard workpiece having a depression which has said final desired or standard volume:
   (b) determining the position of the electrode opposite the depression in the standard workpiece at a reference distance from the upper surface of the workpiece, said electrode and the surface of the depression in the standard piece being separated by a gap (12);
   (c) determining an electrical parameter between the electrode and the standard workpiece in the presence of a fluid electrolyte material in said gap;
   (d) locating the electrode opposite the depression at the reference distance from the upper surface of the raw workpiece, to thereby establish a relative position of the electrode and the raw workpiece, said electrode and depression in the workpiece being spaced from each other and separated by an operating gap (12);
   (e) introducing a fluid electrolyte material in the gap, and filling said gap;
   (f) applying a measurable and controllable electrical current through the opening gap by connecting a power source (G) to the workpiece (10) and the electrode (11), respectively, to effect electrochemical removal of material from the depression in said raw workpiece, while maintaining the relative position of the electrode (11) with respect to the raw workpiece during said electrochemical removal step, whereby, upon workpiece removal due to electrochemical action, the operating gap will increase;
   (g) measuring the same electrical parameter which was previously determined in step (c); and;
   (h) controlling electrical current flow between the electrode and the raw workpiece and through the electrolyte material in said operating gap until the electrical parameter which is measured in step (g) has a value which corresponds to the electrical parameter which has been determined in step (c) with respect to the desired or standard volume of the depression in the standard workpiece.

2. Method according to claim 1, wherein said electrical parameter comprises current flow at a selected voltage through said gap.

3. Method according to claim 1, wherein said electrical parameter comprises resistance between the electrode and the workpiece, whereby step (g) comprises the step of measuring electrical resistance between the electrode and the raw workpiece during electrochemical removal operation.

4. Method according to claim 3, wherein the step of measuring the electrical resistance in step (g) comprises effecting a resistance measurement with low-voltage direct current.

5. Method according to claim 3, wherein the step of measuring the electrical resistance comprises measuring the electrical resistance in step (g) using high-frequency alternating current.

6. Method according to claim 1, wherein the relative position of the tool electrode and the raw workpiece remains fixed and unvarying during the entire step (f) of electrochemical removal of material from said workpiece.

7. Method according to claim 1, wherein the raw workpiece comprises the cylinder head of an internal combustion engine, and said depression comprises at least part of the combustion chamber formed in the cylinder head;
   and wherein the tool electrode has a shape determined at least approximately by the desired shape of said at least part of the combustion chamber.

8. Method according to claim 1, wherein the step (c) of determining an electrical parameter between the electrode and the standard workpiece comprises
   carrying out the steps of
   positioning the electrode spaced from the standard workpiece by said gap,
   which standard workpiece has said depression of said final desired or standard volume formed therein;
   introducing the fluid electrolyte material in said gap, and wherein step (c) further comprises actually measuring said electrical parameter to obtain a standard or reference parameter.

9. Method according to claim 8, wherein said electrical parameter comprises resistance between the electrode and the workpiece;
   and said method further includes the steps of
   obtaining, in step (c), a standard resistance value, forming said standard or reference parameter, representative of the resistance across the gap between the electrode and the standard workpiece having said final desired or standard volume of the depression;
   measuring, in step (g), actual electrical resistance between the electrode and the raw workpiece during electrochemical removal operation to obtain a measured value representative of actual volume of the operating gap as the removal operation proceeds;
   and controlling, in step (h), the current flow across the gap until the actually measured resistance corresponds to the standard resistance.

10. Method according to claim 9, wherein the steps of measuring the electrical resistance in at least one of the steps (c) and (g) comprises effecting a resistance measurement with low-voltage direct current.

11. Method according to claim 9, wherein the steps of measuring the electrical resistance in at least one of the steps (c) and (g) comprises measuring the electrical resistance using high-frequency alternating current.

* * * * *